United States Patent [19]
Bullaro

[11] Patent Number: 5,269,118
[45] Date of Patent: Dec. 14, 1993

[54] SHAFT LOCKING DEVICE

[75] Inventor: Thomas J. Bullaro, Palos Heights, Ill.

[73] Assignee: Continental White Cap, Inc., Downers Grove, Ill.

[21] Appl. No.: 913,470

[22] Filed: Jul. 14, 1992

[51] Int. Cl.⁵ .................. B65B 7/28; B65B 65/00; B67B 3/00
[52] U.S. Cl. .................. 53/315; 403/320; 403/362
[58] Field of Search ........ 192/110 R; 74/10 R, 74/10.41, 813 L; 464/42, 904, 905; 403/362, 263, 320, 315, 343; 53/315, 314, 313, 329

[56] References Cited

U.S. PATENT DOCUMENTS

| | | | |
|---|---|---|---|
| 190,668 | 5/1877 | Cliff | 403/320 |
| 707,298 | 8/1902 | Case | 403/362 X |
| 1,753,154 | 4/1930 | Martus | |
| 2,293,882 | 8/1942 | Batchelder | 403/362 |
| 2,938,698 | 5/1960 | Johnson | 403/362 |
| 3,006,671 | 10/1961 | Opocensky | |
| 3,017,657 | 1/1962 | Mills | 403/362 X |
| 3,054,234 | 9/1962 | Stover | 53/315 X |
| 3,125,397 | 3/1964 | McGrath | 403/362 X |
| 3,347,110 | 10/1967 | Wilson | 403/362 X |
| 3,477,202 | 11/1969 | Zetterberg | 53/315 |
| 3,980,408 | 9/1976 | Jachmann | 403/362 X |
| 4,199,914 | 4/1980 | Ochs et al. | 53/314 |
| 4,279,114 | 7/1981 | Bode | 53/314 |
| 4,436,468 | 3/1984 | Ozaki et al. | 403/320 X |
| 4,490,064 | 12/1984 | Ducharme | 403/362 X |
| 4,544,054 | 10/1985 | Brown | 403/362 X |
| 4,756,639 | 7/1988 | Hoshino | 403/362 X |

Primary Examiner—Horace M. Culver
Attorney, Agent, or Firm—Lockwood, Alex, FitzGibbon & Cumming

[57] ABSTRACT

A shaft locking device for precisely maintaining axial and rotational position of a machine part, with the mechanism including a shaft positioning element having an opening lying along a first axis for receiving a rotatable part, a rotatable and axially moveable part positioned within the opening and including a groove having its centerline or locus of maximum depth lying perpendicular to the machine part rotational axis, with the shaft positioning element further including a threaded set screw arranged coplanar with the groove plane and perpendicular to but offset from the shaft axis and having a contoured end face moveable into cooperating engagement with a portion of the groove surface.

8 Claims, 4 Drawing Sheets

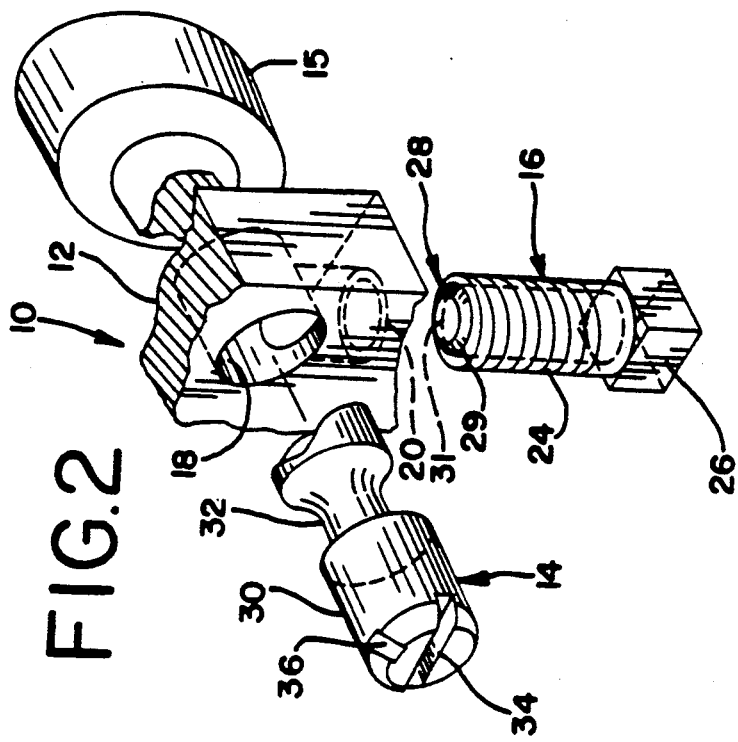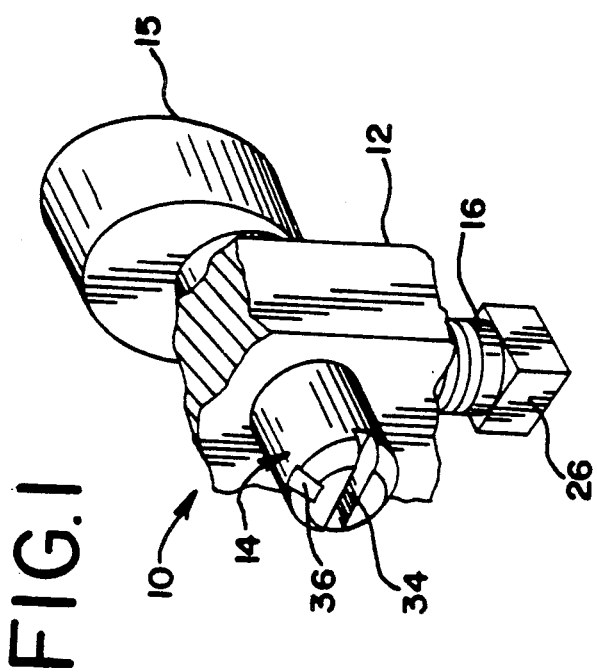

$T_1$    $t_1$ $T_2$    $t_2$ $T_3$    $t_3$ $T_4$    $t_4$ $T_5$    $t_5$ $T_6$    $t_6$

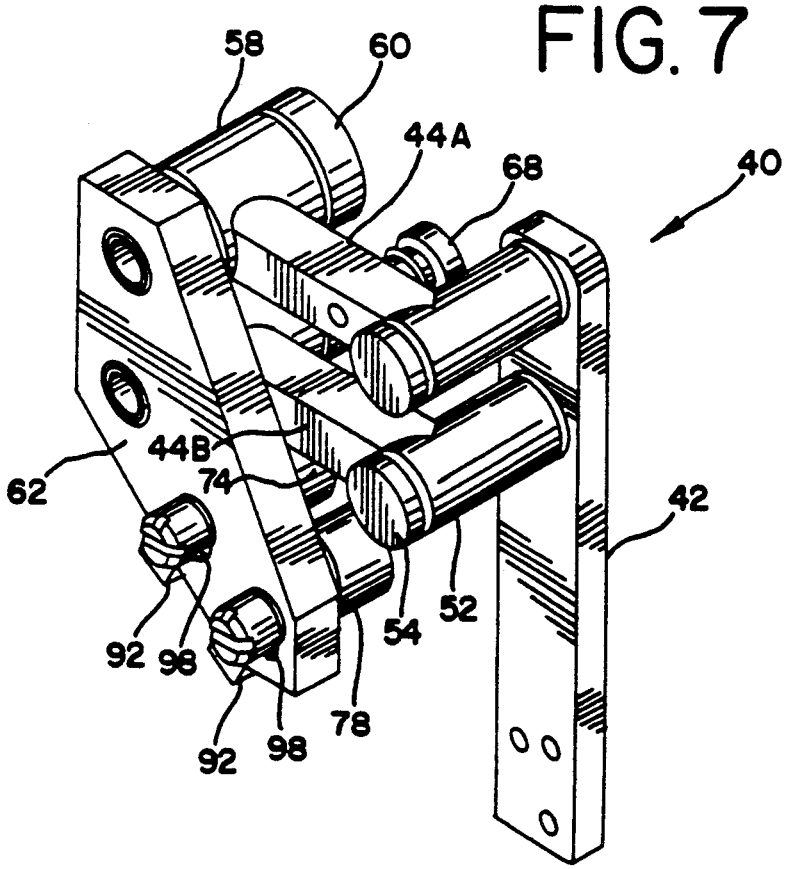
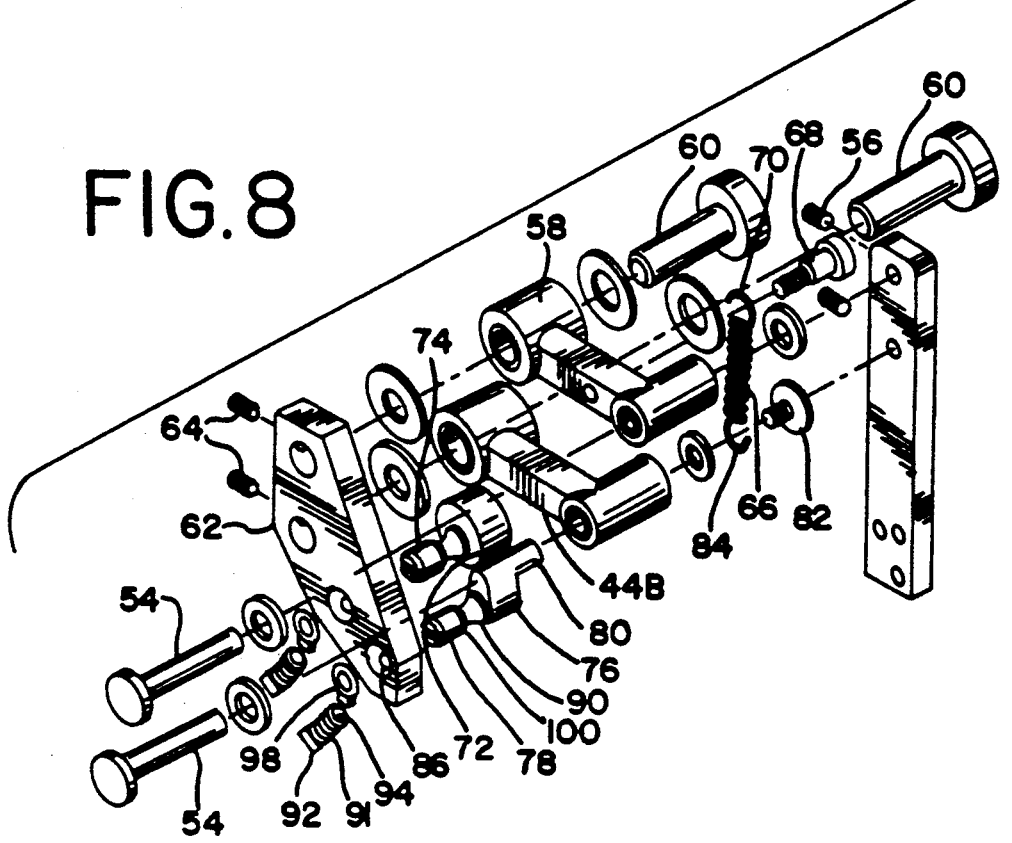

SHAFT LOCKING DEVICE

FIELD OF THE INVENTION

The present invention relates generally to improved apparatus for making precise machine adjustments, and, more particularly, is directed to an assembly permitting precise positioning of a shaft that is subjected to rotational and axial forces in use. In this regard, an important aspect of the present invention concerns an adjustable linear motion control assembly which employs, as a component thereof, a novel locking assembly to secure the shaft in a desired position of adjustment.

BACKGROUND OF THE INVENTION

Prior art attempts to precisely maintain a shaft in a fixed, predetermined position of adjustment when the shaft was subject to rotational and thrust forces have commonly utilized set screw of various configurations to achieve this positioning. In general, these prior art set screws are fitted into a threaded bore in a shaft positioning element and lie perpendicular to a shaft's axis, arranged so that a contact end of the set screw engages a point on the surface of the shaft. This provides the locking force to resist rotational and axial movement of the shaft.

When employed in a machine, this arrangement is often used as an adjustment control to adjust and then maintain the shaft position both axially and in a rotational orientation sense. Other machine elements are also able to be adjusted and locked in this way.

A major disadvantage of the prior art shaft locking assemblies is that, where significant force is required to be generated by the set screw, so as to counteract forces applied to the shaft, the necessary forces are often so great that they cause deformation of the set screw, or cause the contact end of the screw to gouge or form indentations in the shaft body. When an operator was required to make an adjustment to the position of a typical prior art shaft, the set screw was loosened and the shaft was then rotated from its original position to a new or adjusted position. It was then locked in place by engaging the set screw against the shaft.

However, when only a slight rotational adjustment of the shaft was necessary or desired, and when the shaft was deformed or damaged as referred to above, the contact end of the set screw would often engage the indentation previously made in the shaft. When the screw was tightened, it registered with the indentation, causing the shaft to rotate back to its previous position. In other words, the indentation served as a self-centering locating groove unique to a single position.

The operator was therefore required to rotate the shaft well beyond the previously formed indentation, and then tighten the screw against a different portion of the shaft. This in turn could cause additional indentations, eventually preventing the operator from making desirably precise adjustments. This inability to perform the desired adjustments often resulted in machinery operating at less then peak effectiveness; it also sometimes created premature wear and/or damage to the points requiring adjustment.

The same situation occurred when flat spots were created by blunt screw ends.

Another drawback of the prior art shaft locking assemblies was the inability to sequentially lock the shaft against axial movement while still allowing rotational movement of the shaft, then finally locking the shaft against rotational movement. When precise axial positioning and rotational orientation of a shaft utilized as an adjustment or control in a machine is required, it is sometimes desirable to initially to locate the shaft in a predetermined longitudinal position to prevent axial displacement of the shaft while still allowing adjustments to, and subsequent locking of, the rotational positioning of the shaft With prior art set screws, the axial position and rotational orientation of the shaft were often required to be performed simultaneously, making it difficult to precisely fix the shaft in a desired position of multi-axis adjustment.

Additionally, when the contact end of the set screw was deformed from prior use, the contact end of the screw did not always engage the shaft perpendicular to the shaft's axis, frequently causing undesired movement of the shaft either axially or rotationally, also making it difficult or virtually impossible to precisely adjust the position of the shaft. The foregoing problems are not configured to shafts alone, but apply to other machine parts or elements, also.

In accordance with the present invention, some or all of these problems associated with the prior art have been substantially eliminated by providing a new form of adjustment mechanism having several advantages.

It is therefore a principal object of the present invention to provide an improved positioning and locking assembly for shafts or other machine elements.

Another object of the present invention is to provide a shaft locking assembly that fixedly maintains a shaft subject to rotational forces in a desired position without significant deformation of the surface of the shaft body.

Yet another object of the present invention is to provide a shaft locking mechanism wherein the portion to be locked and the set screw end have cooperating contoured surfaces of predetermined form. A further object is to provide a mechanism wherein the axes of the shaft or other machine part and the set screw are arranged in a predetermined relation.

Another object is to provide an adjustment mechanism whereby, in use, a portion of the shaft may be put in tension initially to prevent axial movement of the shaft, while still allowing some rotation of the shaft for adjustment purposes before final locking.

Still another object of the present invention is to provide a shaft locking mechanism utilizing cooperating contact surfaces on a shaft and a screw end, with the shaft and the screw having their axes generally perpendicular to each other but slightly offset from each other.

A still further object is to provide an adjustment mechanism wherein set screw movement sequentially prevents axial movement of the shaft and then rotational movement of the shaft as engagement between the contoured surfaces increases.

Yet another object of the present invention is to provide a precisely adjustable linear motion control for pushing closures onto containers that pass therebeneath, with such control utilizing a shaft locking mechanism having intersecting contoured surfaces, permitting the fine adjustments and retention forces necessary to accommodate various size closures and containers.

A further object of the invention is to provide a adjustment mechanism wherein a shaft element includes a contoured groove having a locus of maximum depth groove centerline lying in a plane perpendicular to the part axis, with the mechanism further including a set screw arranged so that its axis is perpendicular to but offset from the part axis but lies in the plane of the groove centerline.

Yet another object of the invention is to provide an arrangement of moveable machine parts, including a part with a positioning groove and a set screw wherein restriction against axial movement may be provided during the tightening sequence without restricting the availability of locational adjustment, wherein final locking is achieved by a wide area surface contact or interference accompanied by slight deformation of the cooperating parts within their limits of elasticity.

Other objects and advantages of the present invention will become apparent upon reading the following detailed description and appended claims, and upon reference to the accompanying drawings.

The foregoing and other objects and advantages of the invention are achieved in practice by providing a locking device for precisely maintaining axial and rotational position of a machine part, with the mechanism including a shaft positioning element having an opening lying along a first axis for receiving a rotatable part, a rotatable and axially moveable part positioned within the opening and including a groove having its centerline or locus of maximum depth lying perpendicular to the machine part rotational axis, with the shaft positioning element further including a threaded set screw arranged coplanar with the groove plane and perpendicular to but offset from the shaft axis with a set screw having a contoured end face moveable into cooperating engagement with a portion of the groove surface.

For a complete understanding of the present invention reference is now be made to the embodiment illustrated in greater detail in the accompanying drawings and described below by way of example. It should be understood that this invention is not limited to the particular embodiments illustrated herein but is defined by the appended claims.

BRIEF DESCRIPTION OF THE DRAWINGS

FIG. 1 is a perspective view of a shaft locking mechanism made according to the present invention.

FIG. 2 is an exploded perspective view of the shaft locking mechanism of FIG. 1, illustrating the preferred form of circumferential groove encircling the shaft body;

FIG. 7 is a perspective view of a linear motion control mechanism made according to the present invention; and FIG. 8 is an exploded perspective view of the linear motion control mechanism of FIG. 7.

DETAILED DESCRIPTION OF THE PREFERRED EMBODIMENT OF THE INVENTION

Figure 3A:
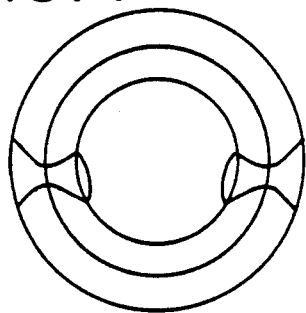
FIGS. 3A–3F are top plan views of the contoured contact end of the set screw made according to the present invention and showing sequential strain curves created by initial and increasingly tight contact between the contact end of the screw the circumferential groove on the shaft body from times T1 to time T6.

While the invention may be embodied in a variety forms and used in different applications, description of one preferred embodiment of the inventive concept will be made wherein the mechanism to be adjusted is utilized in a linear motion apparatus for securing closures or the like in place atop jars or like vessels and wherein the mechanism to be adjusted includes a movement-limiting cam and an eccentric spring tension adjustment mechanism. We turn now to the drawings in greater detail, a shaft locking assembly generally designated 10 is shown in FIG. 1 as including several principle parts. As is best shown in FIG. 2 the shaft locking assembly 10 includes a shaft positioning element 12, a shaft 14 and a set screw 16.

The shaft positioning element 12 includes a shaft-receiving bore 18 extending through the shaft positioning element 12 and a second threaded bore 20 partially extending into the shaft positioning element 12 and lying perpendicular to and slightly offset from the axis of shaft receiving bore 18.

As shown, the set screw 16 includes a threaded cylindrical body 24 having a head 26 at one of its ends and a contact surface at its other end 28. In the illustrated embodiment, head 26 has a square configuration allowing set screw 16 to be manipulated initially by an individual's fingers and then by a wrench or other conventional tools. Other head configurations, however, will be apparent to those skilled in this art.

Contact end 28 of set screw 16 includes a groove-contacting surface portion 29 and a substantially planar surface 31. It is preferred that the set screw contact end 28 be generally frusto-conically shaped. The set screw 16 is adapted to be inserted into the second threaded bore 20, where its conical contact end 28 is then advanced into the area of the shaft-receiving bore 18.

Figure 4:
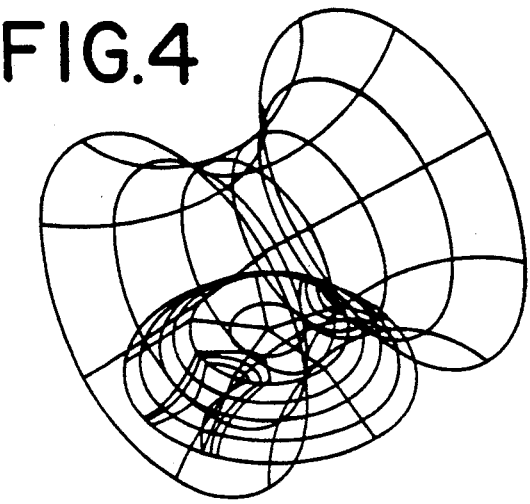
FIG. 4 is a perspective partially schematic view of the conical contact end of the set screw made according to the present invention with the circumferential groove of the shaft body being shown in phantom lines and illustrating strain curves of FIGS. 3A–3C along the contact end upon initial and increasing contact of the contact end with the circumferential groove of the shaft body.

Shaft 14 includes a circumferential locking and centering groove 32 intermediate the ends of the shaft 14 and a slotted turning head 34 adapted to receive a screw driver for assistance in rotating the shaft. An eccentrically mounted cam 15 is illustrated in FIG. 1 affixed to the shaft and being adjustably rotatable about the shafts axis. Slotted turning head 34, if desired, can be provided with an orientation indicia 36 to indicate to an operator the rotational orientation of the shaft 14. As illustrated in FIG. 4, the circumferential groove 32 along the shaft body 30 is generally complementary to the groove-contacting surface portion 29 of the set screw 16. The circumferential groove 32 is formed by rotating a curvilinear line. Preferably a portion of a conic section, about the axis of the shaft. The groove 32 will thus include a locus of maximum depth lying in a plane perpendicular to the shaft axis. This may also be considered as the plane of the groove centerline if the groove is symmetrical.

In operation, shaft 14 is inserted into shaft-receiving bore 18 and the circumferential groove 32 of shaft 14 is centered in the shaft receiving bore 18 such that the axis of second bore 20 lies in the plane of the groove centerline. Set screw 16 is inserted in the second bore 20 of the shaft positioning element 12 and the groove-contacting surface portion 29 is advanced until it engages the circumferential groove 32 of the shaft 14, creating an interference fit between two conical sections.

It is important to note that the longitudinal axis of the second bore 20 is perpendicular to the axis of the first bore but is offset from intersecting the first bore axis by at least a small portion of the diameter of the shaft axis. For example, for a shaft having a diameter of 0.3125 inches and a set screw having a diameter of 0.25 inches, the preferred offset of the axis of the second bore from the first bore axis is 0.02 inches. In another example, for a shaft having a diameter of 0.3125 inches and the set screw having a diameter of 0.190 inches the preferred offset of the axis of the second bore from intersection with the axis of the first bore is 0.041 inches.

Figure 3B:
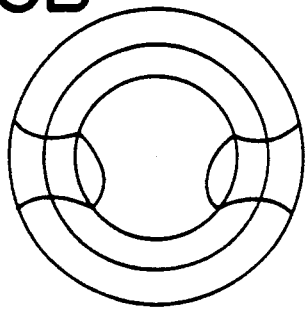
Figure 3C:
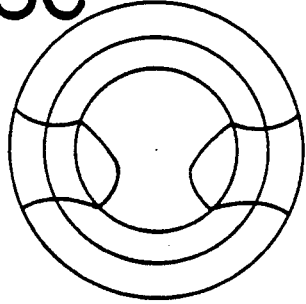
Figure 3D:
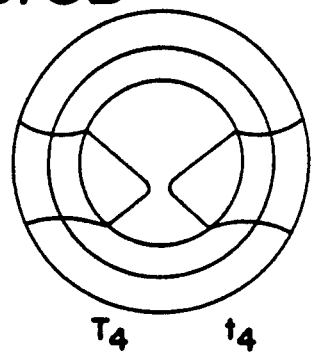
Figure 3E:
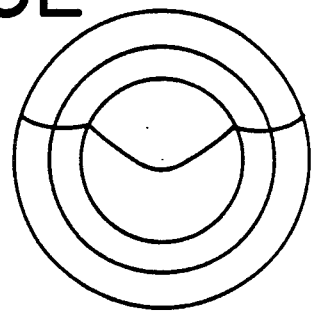

As shown in FIGS. 3A through 3C. the initial contact between groove contacting surface portion 29 of set screw 16 and circumferential groove 32 of shaft 14 creates a force illustrated by the strain curves 38. The intersection of the two conical surfaces redirects or displaces the compressive force of the advancing set screw 16 in a direction parallel to the shaft axis. Therefore, the initial contact between the groove-contacting surface portion 29 of set screw 16 and the surface of the circumferential groove 32 places a portion of the shaft in tension. The force supplied by set screw 18 during initial contact acts parallel to the shaft axis and is illustrated by the strain curves 38, shown with equal and opposite magnitude across the contact end 28 of the set screw 16. The groove contacting surface portion 29 of the screw 16 and the opposed surfaces of the groove 32 undergo gradually increasing interference contact as illustrated by the strain curves, axially locking the shaft 14 and preventing longitudinal movement of the shaft 14 through the shaft-receiving bore 18.

It should be noted that a small amount of the force supplied by the locking screw 18 will act perpendicularly to the shaft's axis; however, since a majority of the force is only acting parallel to the shaft's axis, the shaft 14 is still able to be rotated. It is also important to note that contact with the circumferential groove 32 is only made between the groove-contacting surface portion 29 of the contact end 28 and not with the generally planar surface 31.

Figure 3F:
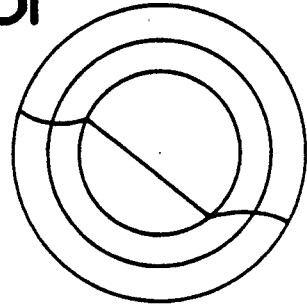
Figure 5:
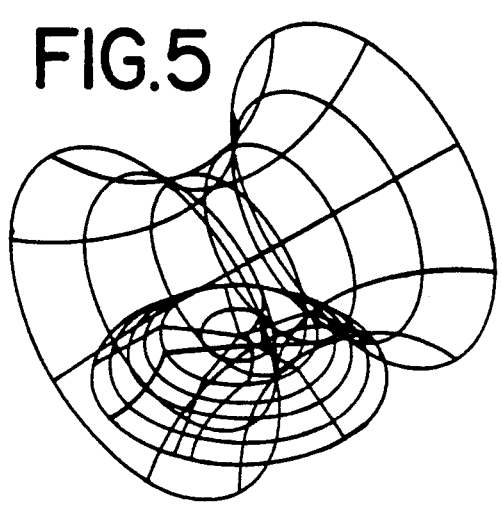
FIG. 5 is a perspective view of the contoured contact end of the set screw according to the present invention, with the circumferential groove about the shaft body shown in phantom lines and illustrating the strain curves of FIGS. 3D–3F when the set screw is securely fastened to the circumferential groove locking the shaft in plate.

As illustrated in FIG. 5, the shaft 14 becomes fully locked when the torque applied to the set screw 16 is high enough to overcome the force displacement characteristics of the intersection of conical surfaces resulting in the force acting perpendicular to the shaft's axis. This is illustrated by the overlapping strain curves 39 shown in FIGS. 3F and 5. The force acting perpendicular to the shaft's axis prevents rotation of the shaft 14. Thus, an operator can adjust and fix the axial position of the shaft 14 and then adjust and fix the rotational position of the shaft 14 precisely in a predetermined position.

The usefulness of the shaft locking assembly's unique ability to fix the axial position of a shaft while allowing rotation of the shaft and subsequently preventing the shaft from rotating will become even more apparent when illustrated with respect to a linear motion control assembly requiring precise adjustment.

The linear motion control device 40 has the general overall shape as illustrated in FIG. 7 and is designed to push caps or closures onto containers such as plastic soda bottles.

The linear motion control device 40 is used for maintaining a downward pressure on a closure or cap, thereby forcing the closure onto a container neck. Closures and containers are fed to a position beneath the linear motion control 40 with the closure disposed above the container and over the container opening. Engagement of the closure with the linear motion control forces the closure downwardly onto the container opening. Further downward pressure may be supplied by a series of linear motion control assemblies that maintain downward pressure as the closure is twisted onto the container by known machine operations.

Figure 6:
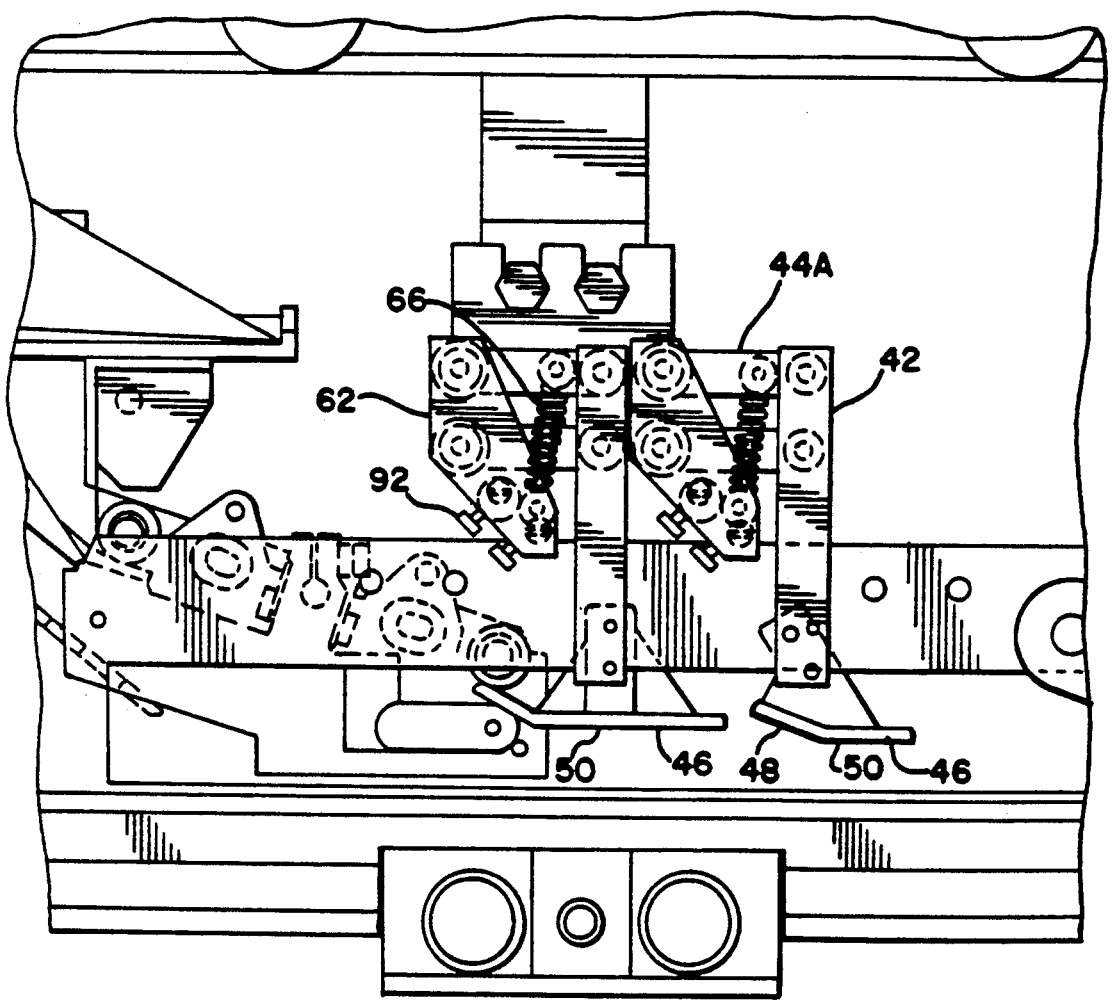
FIG. 6 is a fragmentary side elevational view of a linear motion control made according to the present invention showing the control in place on a cap application mechanism.

The linear motion control device 40 generally includes a vertically extending plate 42 supported by upper and lower horizontally extending support arms 44A and 44B. As illustrated in FIG. 6, a substantially horizontally extending plate 46 may be attached to the lower end of the vertical plate 42 providing a contact area for engaging closures that pass therebeneath. The horizontal plate 46 includes an upwardly angled portion 48 that allows closures to gradually engage the lower surface 50 of the horizontal plate 46.

A horizontally extending cylindrical shaft positioning element 52 is connected to the exterior end of each support arm 44 and includes a bore adapted to receive a pin 54 attaching the element 52 the vertically extending plate section 42. The element 52 permits the pins 54 which are held to the vertically extending plate 42 by set screws 56, to rotate to permit vertical oscillation of the plate 42.

Each of the support arms 44A and 44B are attached at the other interior end to a larger cylindrical shaft positioning element 58 having a bore therethrough for accepting a pin 60. The pins 60 are inserted through the bores and connected to a vertically extending end plate 62 via set screws 64. Each of the larger cylindrical shaft positioning element 58 is rotatable about the pins 60. Thus the support arms 44A and 44B and the shaft positioning elements 52 and 54 cooperating with pins 54 and 60 connect the vertical plate 42 to the end plate 62 by a parallelogram linkage arrangement.

The linear motion control device 40 also includes a tension spring 66 attached at one end to the upper support arm 44A by a shoulder screw 68 extending through an upper hook portion 70 of the spring 66 into the upper support arm 44A.

The linear motion control 40 further includes a height adjustment cam 72 eccentrically mounted to a cam shaft 74 extending through a lower portion of the end plate 62. The lower support arm 44B rests on the height adjusting cam 72 which defines the lower limit for the movement of the upper and lower support arms 44A and 44B. It should be understood that the upper and lower support arms 44A and 44B move in parallel due to the parallelogram linkage arrangement between them and the vertical plate 42. The lower limit for the movement of the support arms 44 may be adjusted by rotating the cam shaft 74 thereby varying the height of the eccentrically mounted cam 72 engaging the support arm 44B.

The linear motion control 40 also includes a spring adjustment cam 76 eccentrically mounted on a shaft 78 extending through a lower portion of the end plate 62. The spring adjustment cam 76 is of any suitable eccentric shape and includes a projection 80 adapted to receive and have secured thereto by a screw 82 the lower hook portion 84 of the spring 66. Rotation of the shaft 78 rotates the 76, thereby varying the tension supplied by the spring 66 to the support arms 44. The spring 66 biases the support arms 44A and 44B downwardly at their lower limit and supplies the force for pushing a closure downwardly when the closure passes beneath the horizontally extending plate 46 connected to the vertical plate 42.

The height adjustment shaft 74 and the spring adjustment shaft 78 are maintained in a predetermined position by the shaft locking assembly 10 made according to the present invention and incorporated into the end plate 62 of the linear motion control device 40.

The end plate 62 of the linear motion control device 40 acts as a shaft positioning element having an horizontally extending first shaft receiving bore 86 adapted to receive a machine part such as the shaft 78 of the spring adjustment cam 76. The end plate 62 includes a threaded second bore (not shown) extending partially through the endplate 62 perpendicularly to the axis of first bore 86.

As shown more clearly in FIG. 8, and in made accordance with the present invention, the shaft 78 utilized by the spring adjustment cam 76 includes a circumferential groove 90 intermediate the ends of the shaft 78. A set screw 92 having a head at one end, a contoured contact end 94 at the other end and a threaded shaft body portion 96 is inserted through the second bore engaging the threaded portion of the second bore for advancing the contact end 94 of the set screw 92 into the area occupied by the first bore 86. The centerline of the circumferential groove 90 of the shaft 78 is aligned adjacent the second bore when the shaft 78 is disposed in the first bore 86 such that the axis of the second bore lies in the same plane as the centerline of the groove 90. The circumferential groove 90 is complementary to the frusto conical contact end 94 of the set screw 92, and contact between the set screw 92 and the circumferential groove 90 results in the compressive force supplied by the locking screw 92 to be displaced parallel to the axis of the shaft 78 in accordance with the present invention. These forces are represented by the strain curves shown in FIG. 3A through 3F which were previously discussed. The shaft 74 is connected to the end plate 62 in an identical manner.

The linear motion control additionally includes a retaining ring 98 adapted to be tightened about a small circumferential groove 90 about the shaft 78 to maintain the shaft in the first bore 86 when the locking screw 92 is not engaged to the shaft.

In operation, the linear motion control 40 is generally disposed in a capping machine as illustrated in FIG. 6 so that closures and containers are fed to a position slightly below and upstream (to the left in FIG. 6) of the linear motion control 40. The vertical plate 42 is downwardly biased by the spring 66 so that the support arms 44 are initially at their lowest limit contacting the height adjustment cam 72. The vertical plate 42 is subject to an up and down motion as closures are passed therebeneath contacting the horizontally extending plate 46 attached to the lower portion of the vertical plate 42 and forced onto the containers.

As the vertical plate 42 is moved up and down by the closures and containers passing therebeneath rotational and thrust force is delivered through the support arms and other elements to the spring adjustment cam 76 and the height adjustment cam 72. Locking of the shafts 74 and 78 by the intersecting contoured sections, preferably of frusto-conical and conic section forms, according to the present invention, prevents rotational and thrusting forces from affecting the height adjustment shaft 74 and spring adjustment shaft 78 from movement out of their predetermined locked position. It also diminishes wear and eliminates shaft damage and "memory".

If adjustments are required, for example, to accommodate different size closures and containers, an operator need only slightly loosen the square head locking screw 92 maintaining contact between the curved surface of the contact end of the locking screw 92 and the circumferential groove 90 of the rotatable shaft 78 of the spring adjustment cam 76 and perform the required adjustment. The shaft 78 is maintained in tension, allowing an operator to position the spring adjustment cam 76 by rotating the shaft 78 while preventing axial displacement of the shaft 78. Retightening the locking screw 92 overcomes the displacement effect of the intersection of the two conical surfaces resulting in a force acting perpendicularly to the shaft's axis locking and securing the shaft 78 in its desired position.

It will thus be seen that the present invention provides a new and useful shaft locking assembly which has a number of advantages and characteristics including those pointed out herein and others which are inherent in the invention. A preferred embodiment of the invention having been described by way of example, it is anticipated that modifications may be made to the described form without departing from the spirit of the invention or the scope of the appended claims.

I claim:

1. A shaft locking device for precisely maintaining the axial position and rotational orientation of a machine part subject to axial and rotational forces, said shaft locking device comprising, in combination, a shaft-and set screw-receiving shaft positioning element having a first shaft-receiving bore and a second bore threaded to receive a set screw, a shaft received within said first bore and being adjustably rotatable about its axis, a set screw including a threaded cylindrical body having a head at one of its ends and an interior frusto-conical, groove-contacting surface portion at the other of its ends, said set screw being axially movable into engagement with a portion of said shaft, said shaft including a circumferentially extending centering and locking groove formed by a curvilinear line spaced apart from and rotated about said shaft axis, said groove thereby including a locus of maximum depth lying in a plane perpendicular to said shaft axis, said set screw receiving bore having an axis lying within the plane of said locus, lying perpendicular to said shaft axis and being offset from said shaft axis by at least a small portion of the diameter of said shaft axis, whereby, when said set screw is advanced into engagement with said shaft, said frusto-conical surfaces of said set screw progressively engage axially spaced apart surface portions of said groove to center said shaft and to place a portion of said shaft in tension, and whereby said contacting surfaces of said screw and opposed surfaces of said groove undergo gradually increasing interference contact so as to prevent rotation of said shaft about said shaft axis.

2. The shaft locking device of claim 1 wherein said initial engagement of the groove contacting surface portion with the circumferential groove creates equal and opposite forces acting on the shaft parallel to the shaft's axis placing the shaft in tension.

3. The shaft locking device of claim 1 wherein said further engagement of said groove contacting surface portion with said circumferential groove creates forces acting perpendicular to the shaft's axis locking the shaft.

4. A shaft locking device for precisely maintaining the position and orientation of a shaft subject to axial and rotational forces, said shaft locking device comprising:

a shaft positioning element having a first bore extending therethrough and a second threaded bore extending partially therethrough and perpendicularly intersecting said first bore;

a shaft having a longitudinal axis adapted to be received within said first bore, a portion of said shaft having a circumferential groove, said circumferential groove in alignment with said intersecting second bore when said shaft is disposed in said shaft positioning element;

a locking screw adapted to be received in said second bore, said screw including a threaded cylindrical body portion having a turning head at one end and having a conically shaped contact surface at the other end adapted to engage the circumferential groove of said shaft, the screw including an axis perpendicular to the centerline of said shaft and offset from the centerline of said shaft up to a distance equal to twenty five percent of the diameter of the screw, the circumferential groove including a frusto-conical surface complementary to said conical contact surface end of said locking screw, the frusto conical surfaces each having an axis perpendicular to the shaft's centerline whereby initial engagement of said conical contact surface end with said circumferential groove creates equal and opposite forces acting on the shaft parallel to the shaft's axis preventing axial movement of said shaft and further engagement of said contact end with said circumferential groove creates forces acting on the shaft perpendicular to the shaft's axis preventing rotational movement of said shaft.

5. The invention of claim 4 wherein said initial engagement and said further engagement between said conical contact surface end and said circumferential groove is limited to contact between said frusto conical surfaces of said contact end and said circumferential groove.

6. A linear cap control assembly for urging a closure fed to a position below the cap control assembly onto a container passing beneath the cap control, said cap control comprising in configuration:

a fixed frame element;

a movable member for urging a closure onto a container;

a pair of locating link control arms each pivotally attached at its interior end to said frame and pivotally attached at its exterior end to said movable member whereby said member reciprocates along a given path parallel to a given portion of said frame element, said linear cap control further comprising, first adjustment means for adjustably limiting the movement of said locating link control arms including, a shaft-and set screw-receiving shaft positioning element having a first shaft-receiving bore and a second bore threaded to receive a set screw, a shaft received within said first bore having an eccentrically mounted cam, said shaft and cam being adjustably rotatable about the shaft's axis, said cam adapted to engage at least one of said locating link control arms a set screw including a threaded cylindrical body having a head at one of its ends and an interior frusto-conical, groove-contacting surface portion at the other of its ends, said set screw being axially movable into engagement with a portion of said shaft, said shaft including a circumferentially extending centering and locking groove formed by a curvilinear line spaced apart from and rotated about said shaft axis, said groove thereby including a locus of maximum depth lying in a plane perpendicular to said shaft axis, said set screw receiving bore having an axis lying within the plane of said locus, lying perpendicular to said shaft axis and being offset from said shaft axis by at least a small portion of the diameter of said shaft axis, whereby, when said set screw is advanced into engagement with said shaft, said frusto-conical surfaces of said set screw progressively engage axially spaced apart surface portions of said groove to center said shaft and to place a portion of said shaft in tension, and whereby said contacting surfaces of said screw and opposed surfaces of said groove undergo gradually increasing interference contact so as to prevent rotation of said shaft about said shaft axis whereby the movement of the locating link control arms is adjustably limited.

7. The invention of claim 6 further including a tension mechanism for biasing the lower end of said movable member in a predetermined position.

8. The invention of claim 7 wherein said tension mechanism includes a control mechanism for adjusting the tension supplied to the movable member including a spring attached to at least one of said locating link control arms and an eccentrically mounted cam, a shaft-and set screw-receiving shaft positioning element having a first shaft-receiving bore and a second bore threaded to receive a set screw, a shaft received within said first bore and being adjustably rotatable about its axis, a set screw including a threaded cylindrical body having a head at one of its ends and an interior frusto-conical, groove-contacting surface portion at the other of its ends, said set screw being axially movable into engagement with a portion of said shaft, said shaft including a circumferentially extending centering and locking groove formed by a curvilinear line spaced apart from and rotated about said shaft axis, said groove thereby including a locus of maximum depth lying in a plane perpendicular to said shaft axis, said set screw receiving bore having an axis lying within the plane of said locus, lying perpendicular to said shaft axis and being offset from said shaft axis by at least a small portion of the diameter of said shaft axis, whereby, when said set screw is advanced into engagement with said shaft, said frusto-conical surfaces of said set screw progressively engage axially spaced apart surface portions of said groove to center said shaft and to place a portion of said shaft in tension, and whereby said contacting surfaces of said screw and opposed surfaces of said groove undergo gradually increasing interference contact so as to prevent rotation of said shaft about said shaft axis.

* * * * *